United States Patent
Vaziri

(10) Patent No.: US 11,165,239 B2
(45) Date of Patent: Nov. 2, 2021

(54) VIRTUAL ELECTRONIC CIRCUIT BREAKER

(71) Applicant: Astronics Advanced Electronic Systems Corp., Kirkland, WA (US)

(72) Inventor: Massoud Vaziri, Redmond, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 17/247,069

(22) Filed: Nov. 27, 2020

(65) Prior Publication Data
US 2021/0184452 A1 Jun. 17, 2021

Related U.S. Application Data

(63) Continuation of application No. 15/341,321, filed on Nov. 2, 2016, which is a continuation-in-part of application No. 14/044,303, filed on Oct. 2, 2013, now abandoned.

(51) Int. Cl.
| | |
|---|---|
| *H02H 3/16* | (2006.01) |
| *H02H 1/06* | (2006.01) |
| *H02H 3/10* | (2006.01) |
| *H02H 3/08* | (2006.01) |

(52) U.S. Cl.
CPC ............ *H02H 3/165* (2013.01); *H02H 1/06* (2013.01); *H02H 3/083* (2013.01); *H02H 3/105* (2013.01)

(58) Field of Classification Search
CPC .................... H02H 3/08–165; H02H 1/06
See application file for complete search history.

(56) References Cited

U.S. PATENT DOCUMENTS

| | | | | |
|---|---|---|---|---|
| 5,956,222 A | * | 9/1999 | Wittner | H01H 47/14 361/115 |
| 6,470,224 B1 | * | 10/2002 | Drake | B64D 41/00 700/22 |
| 2006/0108873 A1 | * | 5/2006 | Hamasaki | H02J 13/00017 307/10.1 |
| 2006/0267406 A1 | * | 11/2006 | Mehrer | H02J 1/14 307/9.1 |
| 2010/0324747 A1 | * | 12/2010 | Lee | H02H 3/33 700/293 |
| 2011/0222200 A1 | * | 9/2011 | Fuller | H01H 9/548 361/100 |

* cited by examiner

*Primary Examiner* — Jared Fureman
*Assistant Examiner* — Christopher J Clark
(74) *Attorney, Agent, or Firm* — Wiggin and Dana LLP; Gregory S. Rosenblatt; Thomas M. Landman

(57) ABSTRACT

A virtual electronic circuit breaker having an electrical relay and a control circuit, the control circuit including a load and wire protection ("OC") detection unit, a microprocessor and a driver. The OC detection unit is configured to monitor a power flow and the electrical relay is effective to control it. The driver is effective to cause the relay to stop the power flow upon receipt of a deactivation command. The OC detection unit is effective to cause the driver to receive a deactivation command if the OC detection unit senses that a short circuit condition or an overload condition exists. The microprocessor of the control unit is configured so as to be capable of, at least, receiving input from the OC detection unit and sending output to the driver.

12 Claims, 8 Drawing Sheets

VIRTUAL ELECTRONIC CIRCUIT BREAKER

CROSS-REFERENCE TO RELATED APPLICATIONS

This application is a continuation of U.S. patent application Ser. No. 15/341,321 filed Nov. 2, 2016, which is a continuation-in-part of U.S. patent application Ser. No. 14/044,303, filed Oct. 2, 2013, both of which are herein incorporated by reference in their entirety.

FIELD OF THE DISCLOSURE

The subject matter of the present disclosure generally relates to circuit control devices, and more particularly relates to virtual circuit breakers utilizing microprocessors.

BACKGROUND OF THE DISCLOSURE

Control devices for circuits are important in many electrical applications. For instance, various circuit breaker designs that are useful in numerous applications have been previously developed and disclosed.

In current aerospace power distribution systems, electrical loads are fed through a thermal circuit breaker and a power relay connected in-series, in order to provide load and wire protection (over-current or "OC") and load On/Off control (switching). Alternatively, a Solid State Power Controller (SSPC) may be used to perform these same functions.

The thermal circuit breaker/power relay solution has a long service history, but this combination can be bulky and labor intensive for installation and troubleshooting. The SSPC solution has also been successfully implemented and operated with favorable service history. However, SSPCs are not cost and/or volume effective for higher power loads, largely due to the fact such applications require a high number of metal-oxide-semiconductor field-effect transistors (MOSFETs).

By example, U.S. Pat. No. 6,470,224 to Drake et al. discloses an aircraft power system including a SSPC disposed within a secondary power distribution assembly. Another example is U.S. Patent Application Publication No. 2013/0100567 to Reynolds et al., which discloses a system for protecting electrical power distribution circuits. Yet another example is U.S. Patent Application Publication No. 2013/0050880 to Rozman et al., which discloses a solid state power controller system. The disclosures of U.S. Pat. No. 6,470,224 and Patent Application Publication Nos. 2013/0100567 and 2013/0050880 are incorporated by reference herein in their entirety.

The subject matter of the present disclosure is directed to overcoming, or at least reducing the effects of, one or more of the problems set forth above.

BRIEF SUMMARY OF THE DISCLOSURE

Disclosed is a virtual electronic circuit breaker (VECB) having an electrical relay and a control circuit. The electrical relay is effective to control the power flow of a power line. The control circuit has a load and wire protection ("OC") detection unit, a microprocessor and a driver. When an overload or short circuit condition is detected, the driver receives a command that the relay should stop the flow of power in the power line and, in return, the relay is caused to shut off power flow in the line, thus preventing or mitigating potential damage and/or harm.

There exists many different embodiments of the disclosed system, including many that have additional functionality to that discussed above. For instance, a redundant power supply can allow the relay and control circuit to operate without another source of power. A ground fault interrupt (GFI) detection unit can sense, and begin the response to, a ground fault condition. The microprocessor of the control circuit can actively control the circuit's operation, and in some embodiments, receive and communicate information with other components outside the disclosed system.

The disclosed subject matter presents several advantages over previously available systems and methods.

One advantage of the disclosed subject matter is that it can be utilized with 1-phase Alternating Current (AC), 3-phase AC or Direct Current (DC) power with minor circuit changes.

Another advantage is that utilization of the disclosed subject matter may decrease overall project costs, depending in part on the load rating of any particular implementation.

Yet another advantage of the disclosed subject matter is that it allows for the utilization of conventional, proven components such as off the shelf (OTS) power relays and control circuits. This may, in turn, result in schedule and project cost reductions.

Yet another advantage of the disclosed subject matter is that an overcurrent rating change only requires a software set-point change, given that the power relay should be compatible for the highest programmable VECB rating.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

Like reference numbers and designations in the various drawings indicate like elements. Arrows in the schematic drawings should be understood to represent logic pathways that are generally indicative of the flow direction of information or logic, and that such arrows do not necessarily represent traditional electrical pathways.

DETAILED DESCRIPTION OF THE DISCLOSURE

Figure 1:
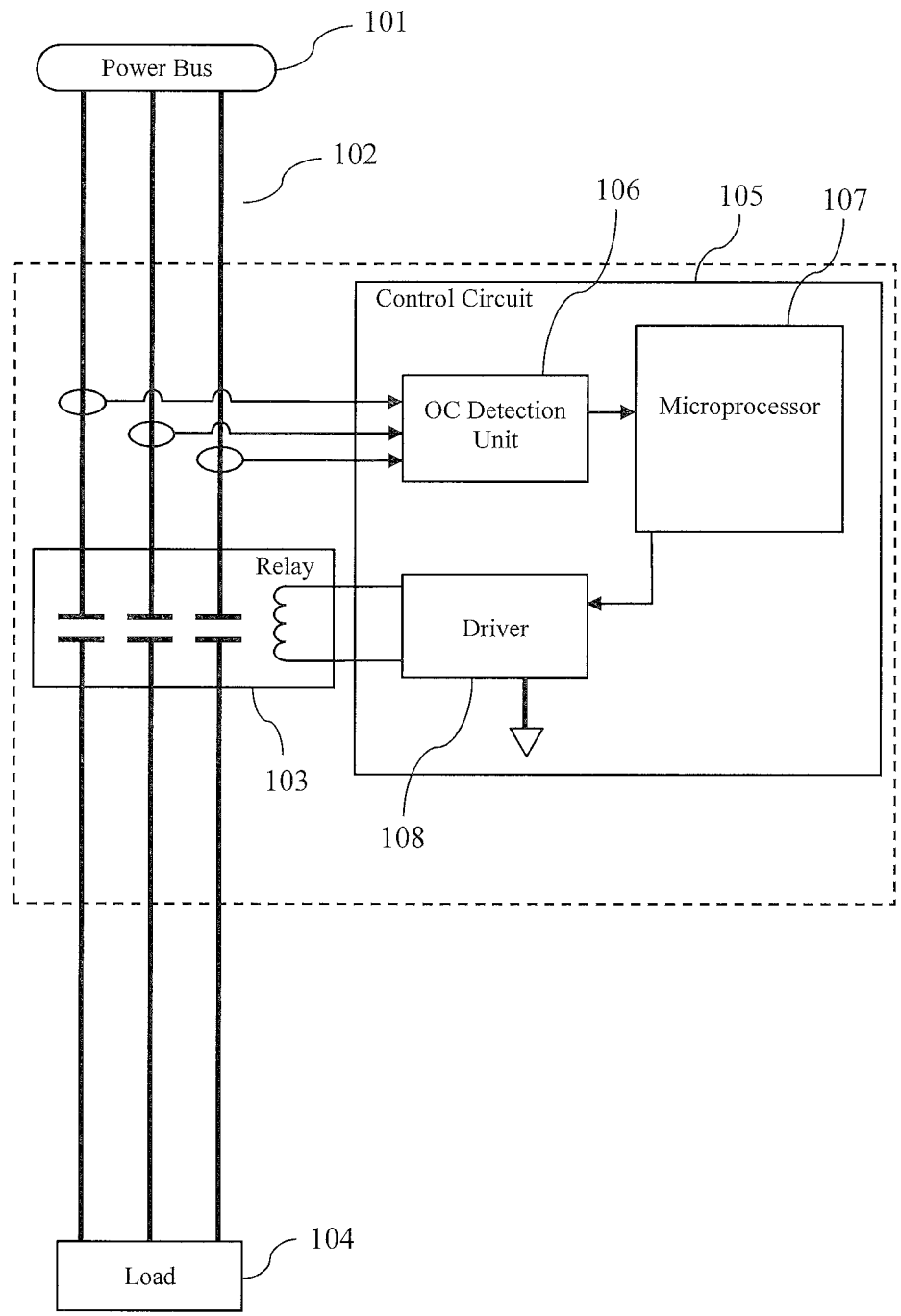
FIG. 1 is a schematic diagram of an embodiment, having a power bus, relay, load and control circuit.

FIG. 1 is a schematic diagram of one embodiment of the VECB. A power bus 101, which may be a source of limited power, such as a generator on an aircraft, supplies an amount of power flow along power line 102, which is in this embodiment carrying 3-phase AC power. It should be understood that the disclosed subject matter can be utilized with 1-phase AC and 3-phase AC power, as well as other power configurations, including without limitation 28 VDC and 270 VDC. Electrical relay 103 is effective to control this power flow. For example, relay 103 can allow power to flow from power bus 101 to load 104 or, inversely, prevent such flow. Various electrical relays are suitable for use with the disclosed subject matter, including by way of example commercially available OTS units. Control circuit 105 includes OC detection unit 106, microprocessor 107 and driver 108. Upon receipt of a deactivation command, driver 108 is effective to cause relay 103 to stop the flow of power in power line 102. OC detection unit 106 is configured to monitor the power flow in power line 102 with, for example, a current sensor(s). OC detection unit 106 is capable of detecting whether a short circuit or overload condition exists. If one of these conditions is sensed, OC detection unit 106 causes driver 108 to receive a deactivation command, which, in turn, would cause the power flow in power line 102 to be shut off, thereby preventing or limiting the damage or harm that might otherwise be caused by an overload or short circuit condition. Microprocessor 107 is configured to, at a minimum, be capable of receiving input from OC detection unit 106 and sending output to driver 108. It is understood that microprocessor 107 may perform any number of additional functions, and may be programmable to operate and control the control circuit 105 in a variety of fashions.

Figure 2:
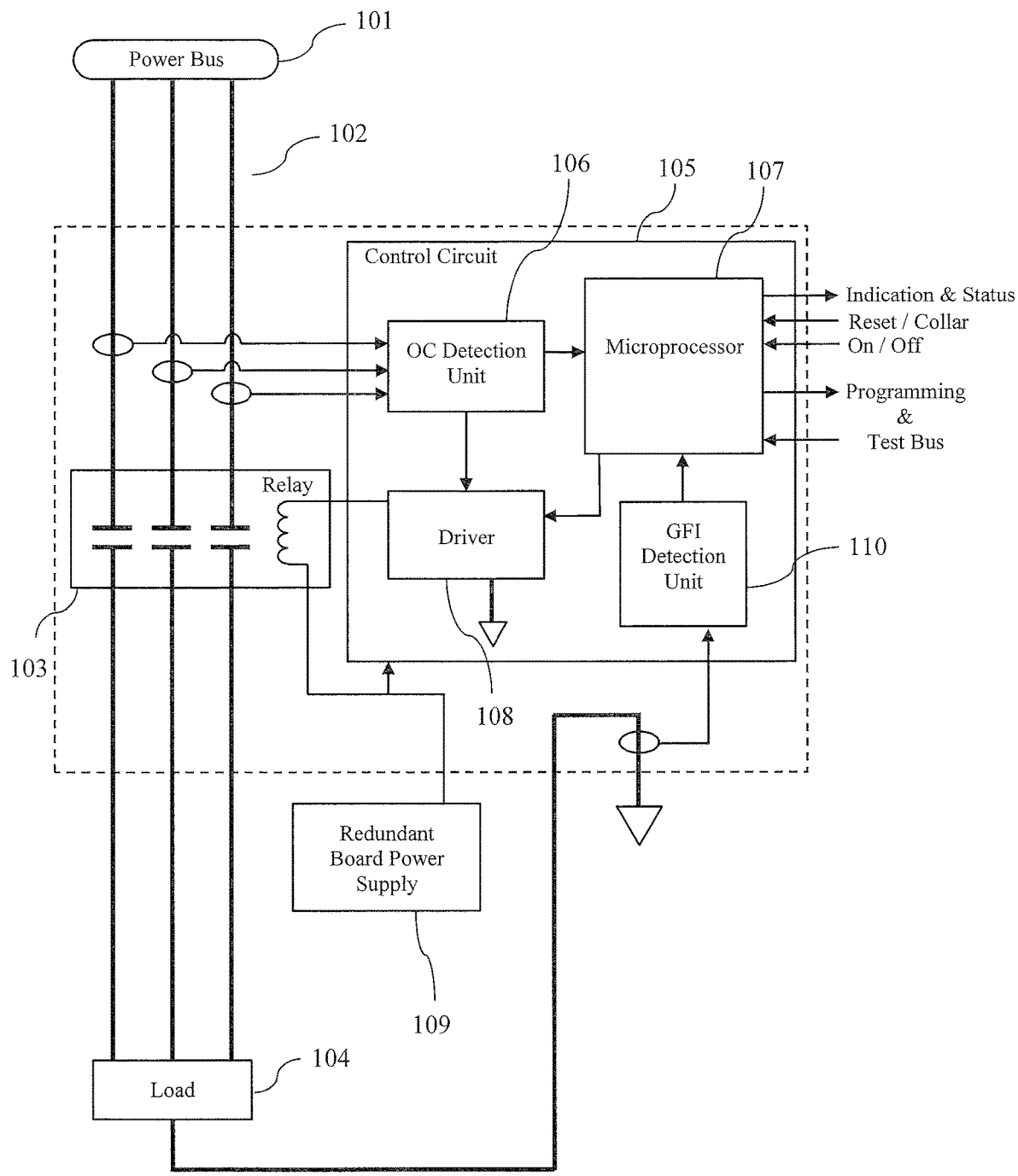
FIG. 2 is a schematic diagram of the embodiment of FIG. 1, having additional features such as a redundant board power supply and GFI detection function.

FIG. 2 is a schematic diagram of the embodiment of FIG. 1 having additional features and functionality. Redundant Board Power Supply 109 is connected to control circuit 105 and relay 103 and is effective to allow control circuit 105 and relay 103 to operate even when redundant board power supply is the only power source for these units. Such a redundant power supply increases overall system integrity and can help guard against unexpected power loss from other sources. This can be particularly important in applications, such as aircraft, where it is critical that system functionality be maintained even in the event of a loss of primary power.

In the embodiment of FIG. 2, microprocessor 107 is capable of sending and receiving various information outside of the control circuit. Such functionality may be useful in applications where control of the embodiment system by an outside entity, for instance a flight officer of an aircraft, is advantageous or required. In the embodiment, indication and status information is sent outside of the embodiment system. This information, by way of example, may be recorded, viewed, analyzed or otherwise manipulated. For example, a visual control panel in the cockpit of an aircraft could indicate to a flight officer that the embodiment system is operating effectively. It is understood that there are many human interface schemes, for example, flight deck multi-function displays (MFDs), capable of being utilized with the disclosed subject matter and which will be apparent to those of skill in the art to which the present disclosure pertains.

In the embodiment of FIG. 2, microprocessor 107 is effective to receive "reset," "collar," "on," and "off" commands from outside of the embodiment system. This allows the embodiment system, and thus the power flow in power line 102, to be controlled remotely, either automatically or by a human operator. For instance, upon receipt of an "off" command by the microprocessor, the microprocessor may cause driver 108 to receive a deactivation command and thereby cause relay 103 to shut off power flow in power line 102.

In the embodiment of FIG. 2, microprocessor 107 is effective to communicate with a programming and test bus. This allows for the embodiment virtual circuit electronic breaker to be tested to ensure correct operation, and in certain embodiments, for the circuit to be programmed with various settings and/or for various tasks. For example, the threshold for determining that an overload condition existed in the circuit could be raised, to for example, account for load equipment with higher current demand that require larger wire gage that are designed for higher overloads in power line 102. It should be understood that microprocessor 107 may receive input from various input devices, such as control panels, keyboards, etc.

The embodiment depicted by FIG. 2 includes GFI detection unit 110. In the particular embodiment, the GFI detection unit 110 is integrated with control circuit 105, but could optionally be not integrated. GFI detection unit 110 is effective to, when it senses that a ground fault condition has occurred, communicate to the microprocessor that such a condition has occurred. This allows the embodiment system to detect and react to ground fault conditions. In an embodiment, an arc fault detection and protection algorithm can be programmed into the microprocessor. In another embodiment, GFI protection can be added by including an additional current sensor (i.e., current transformer or hall effect sensor).

Figure 3:
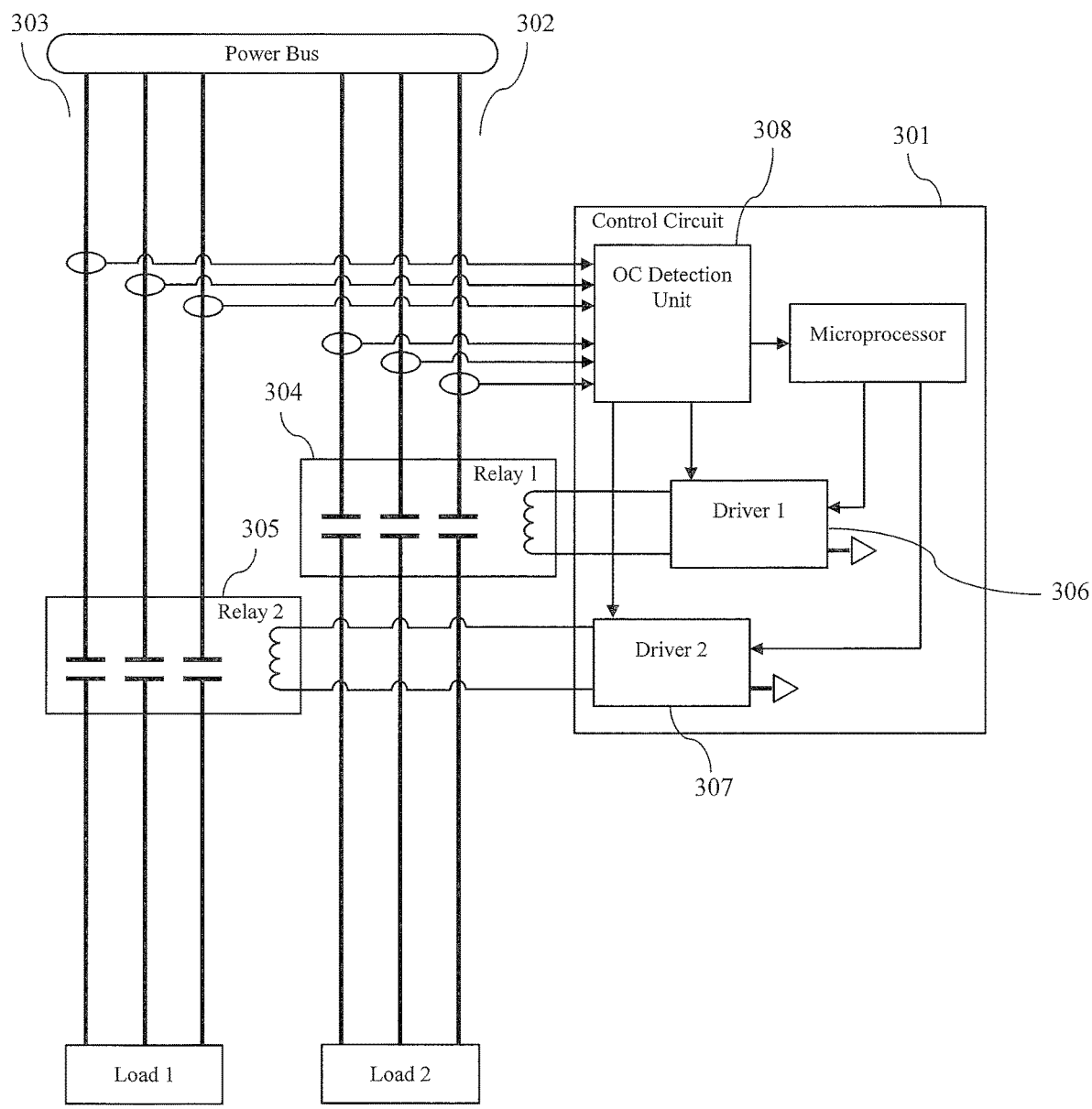
FIG. 3 is a schematic diagram of an embodiment having two relays, each connected to a dedicated driver.

FIG. 3 is a schematic depiction of an embodiment in which a single control circuit 301 operates to control the power flow in both first power line 302 and second power line 303. In the embodiment, first relay 304 is effective to control the flow of power in first power line 302. Similarly, second relay 305 is effective to control the flow of power in second power line 303. First driver 306 is effective to cause first relay 304 to stop the flow of power in first power line 302 upon receipt by first driver 306 of a deactivation command. Similarly, second driver 307 is effective to cause second relay 305 to stop the flow of power in second power line 303 upon receipt by second driver 307 of a deactivation command. OC detection unit 308 monitors both first power line 302 and second power line 303 and is effective to cause first driver 306 or second driver 307 to receive a deactivation command if a current overflow or short circuit condition is detected in first power line 302 or second power line 303, respectively. As illustrated by the embodiment depicted by FIG. 3, components utilized in practicing the disclosed subject matter need not have one-to-one relationships with one another or exist only in single units.

In one embodiment, relay 103 is connected in parallel with a solid state switch (SSSW). The SSSW is configured to close before the relay 103 activates. Thus, before the relay 103 opens or closes, the SSSW closes, which in turn prevents arc formation on the relay contacts. Without the SSSW connected in parallel with the relay 103 and being configured to close before the relay activates, the relay 103 would otherwise need to be upsized significantly to prevent arc formation. However, the use of a relay in parallel with the SSSW prevents arc formation that would otherwise results from the high voltage.

The invention utilizes the Tyco/Axicom V23079 relay (manufactured by TE Connectivity Ltd. of Schauffhausen, Switzerland), which is a standard telecom relay with a switching current of 5 Amps and two changeover contacts formed from silver nickel and gold-covered. The V23079 relay is rated for a 2 Amp continuous current. Product literature accompanying the relay recommends to never parallel relay contacts to double the contact rating.

In this embodiment, the relay 103 includes two sets of contacts. Each set of relay contacts is initially rated for 2 Amps maximum continuous current. However, using the aforementioned inventive feature of connecting the relay in parallel with the SSSW, total continuous current is able to run at up to 4 Amps per contact (8 Amps per contact set). Thus, use of the parallel formation of SSSW with relay 103 allows for a contactor to be utilized at twice the specification rating, which allows for a reduction of the relay size otherwise required. It should be noted that the invention additionally contemplates current flow of 5 Amps per contact, up to 10 Amps per set.

Figure 4:
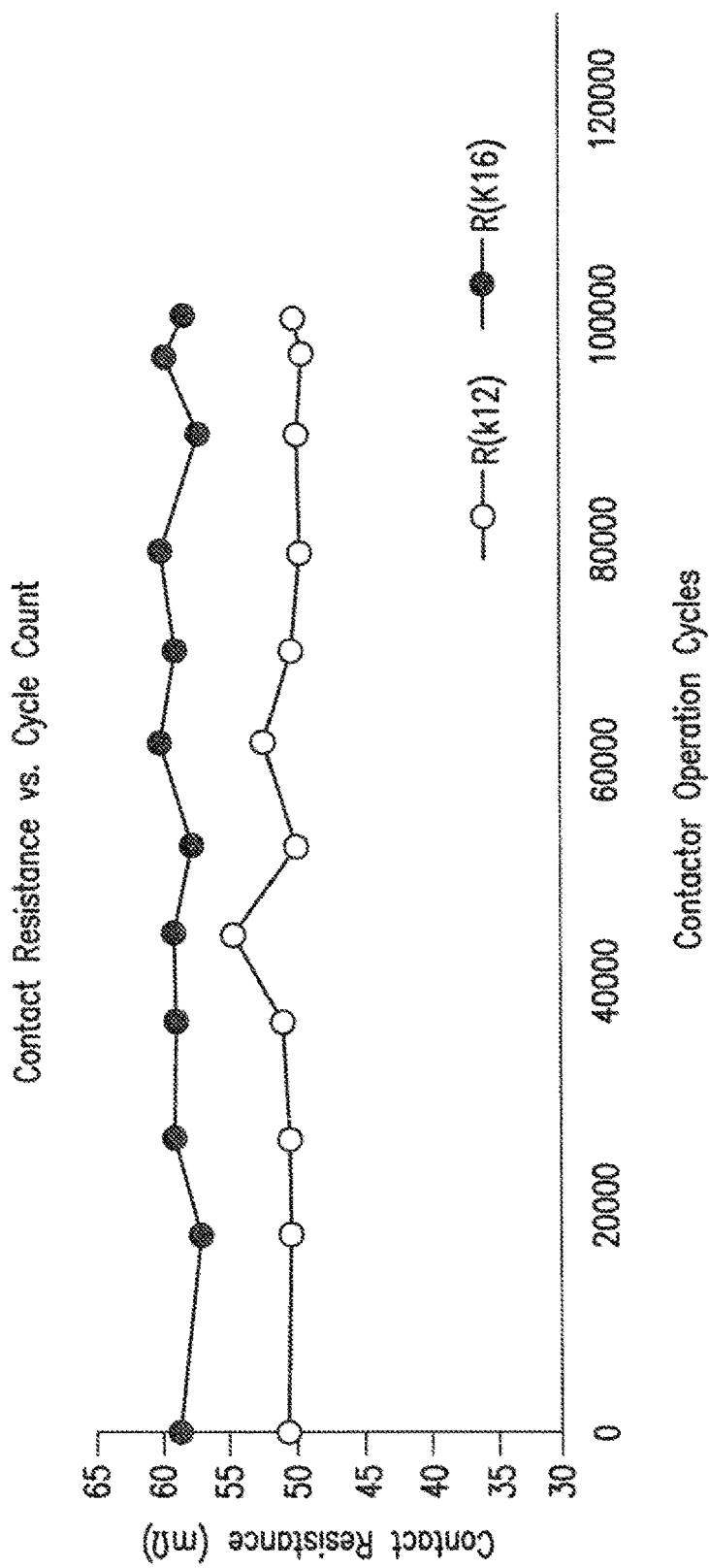
FIG. 4 is a diagram of degradation testing.

The invention performed testing to increase the maximum current to exceed double the rated current by paralleling relay contacts with a SSSW. Relay degradation was determined by analyzing contact resistance, with a measurement taken before each testing series, and then again at points during testing. Utilizing the inventive device, contact resistance did not change during testing, indicating minimal relay degradation. The testing results are in FIG. 4.

Figure 5:
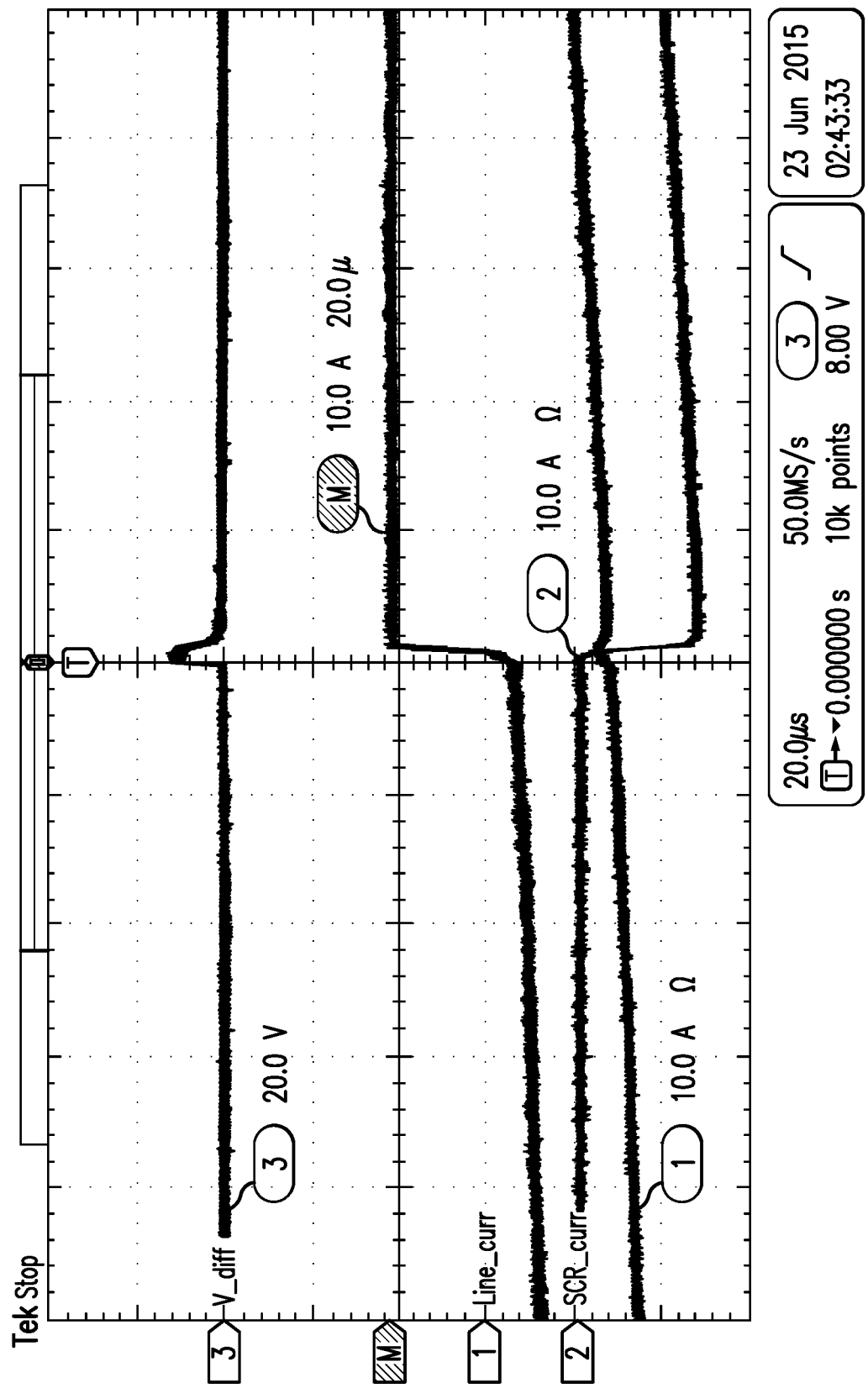
FIG. 5 is a diagram of waveforms during relay opening.
Figure 6:
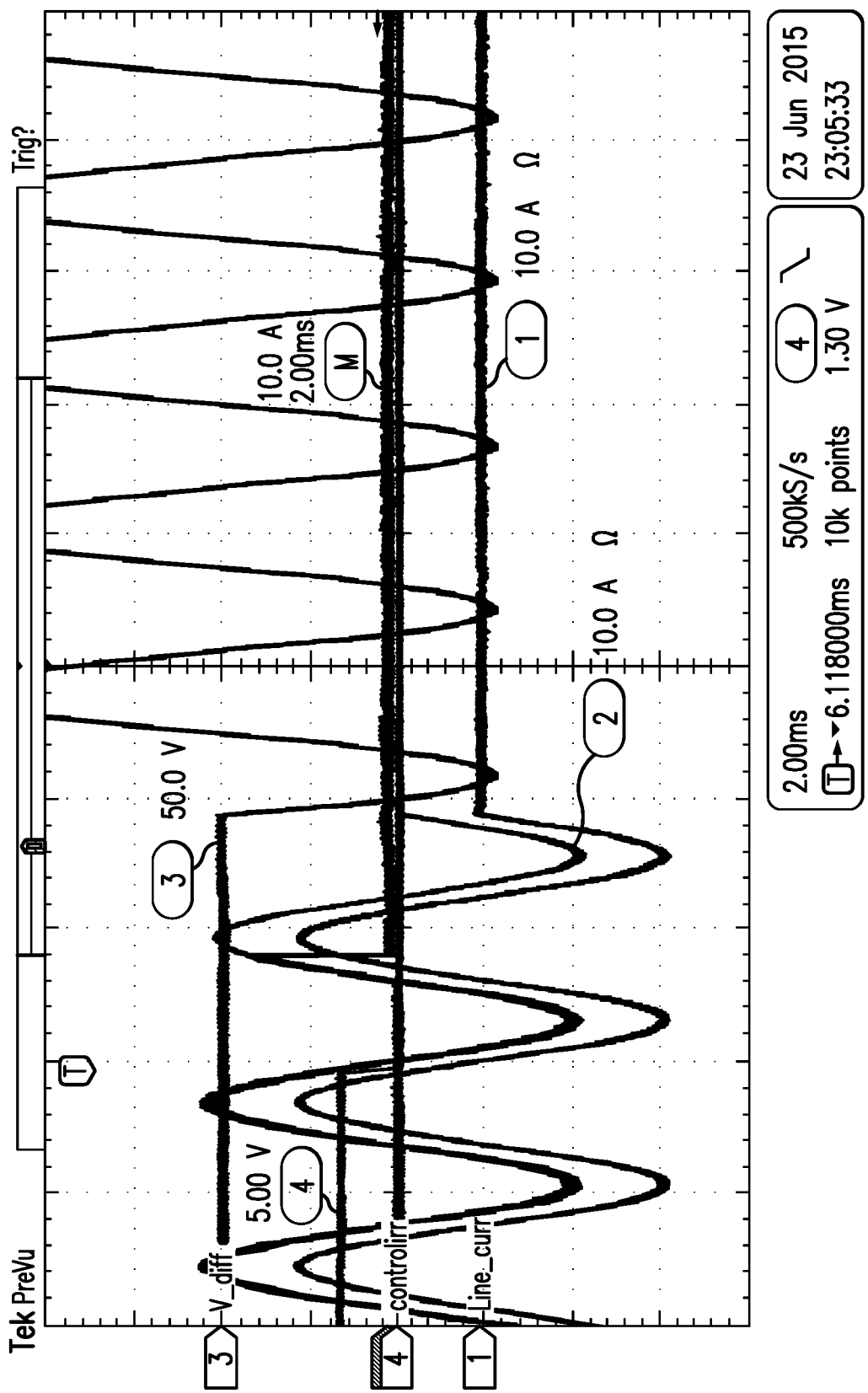
FIG. 6 is a diagram of waveforms during the contactor commutation period.

The testing included capturing waveforms to provide details about the contactor commutation process. The waveforms are illustrated in FIGS. 5-6. FIG. 5 illustrates waveforms of a zoomed-in period of the relay opening, and the transition of current from the relay to the silicon-controlled rectifier (SCR). FIG. 6 illustrates a wider view of the entire commutation period.

As shown in FIG. 5, CH1 is the line during the commutation process. CH2 is the SCR current, and CHM is the relay current. CH3 is the voltage across the relay at 20V/div. FIG. 5 illustrates that the transition of current from relay to SCR occurs quickly, in 1-2 microseconds, and that voltage across the relay never rise to a potential voltage for arcs to occur.

FIG. 6 illustrates CH4 as the control input to open the contactor. The contactor does not open until the relay starts to open (i.e., after a delay). As shown, the current quickly transfers from the relay (CHM) to the SCR (CH2), and then terminates within another two microseconds on a current zero crossing.

The inventive device can therefore provide a reliable contactor that can sustain in excess of 1,500,000 cycles of contact cycles using a small, inexpensive relay.

Figure 7:
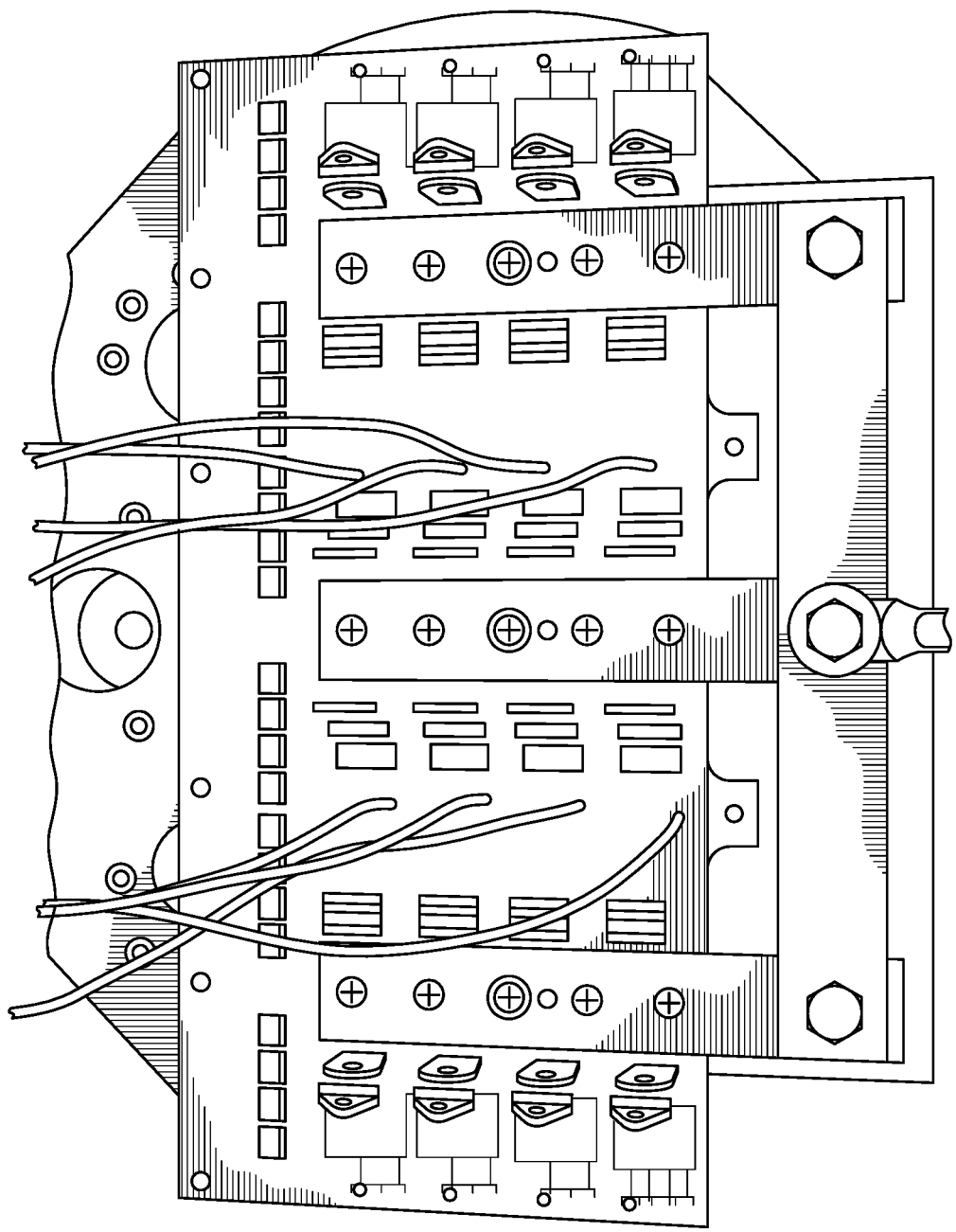
FIG. 7 illustrates a circuit board for use during lifecycle testing.

FIG. 7 illustrates an exemplary circuit board lifecycle test board, showing a bus contactor and load connections, used to test the relay.

The inventive relay 103 in accordance with this embodiment allows for switching of AC currents up to 15 Amps on a 115 VAC, 400 Hz power bus. Control circuit 105 enables or closes an opto-isolator, and then opens relay 103. The circuit 105 controls the relay opening asynchronously with the AC bus waveform, allowing the relay to open under minimal load stress due to the opto-isolator having zero-cross detection features. Contactors do not open until the relay begins to open (usually a delay of about 2 microseconds).

Once the relay 103 begins to open, voltage across the relay causes a SCR in parallel with the relay 103 to trigger. This causes current going through the relay to transfer to the SCR, causing the relay 103 to then complete its opening with no arc formation. The SCR then opens at the next current zero. It should be noted that transition of current from relay 103 to SCR occurs very quickly, such as 1-2 microseconds or a similar timeframe, thereby not allowing the voltage across the relay to rise to an arc potential. This avoids any damage to the contactors.

Figure 8:
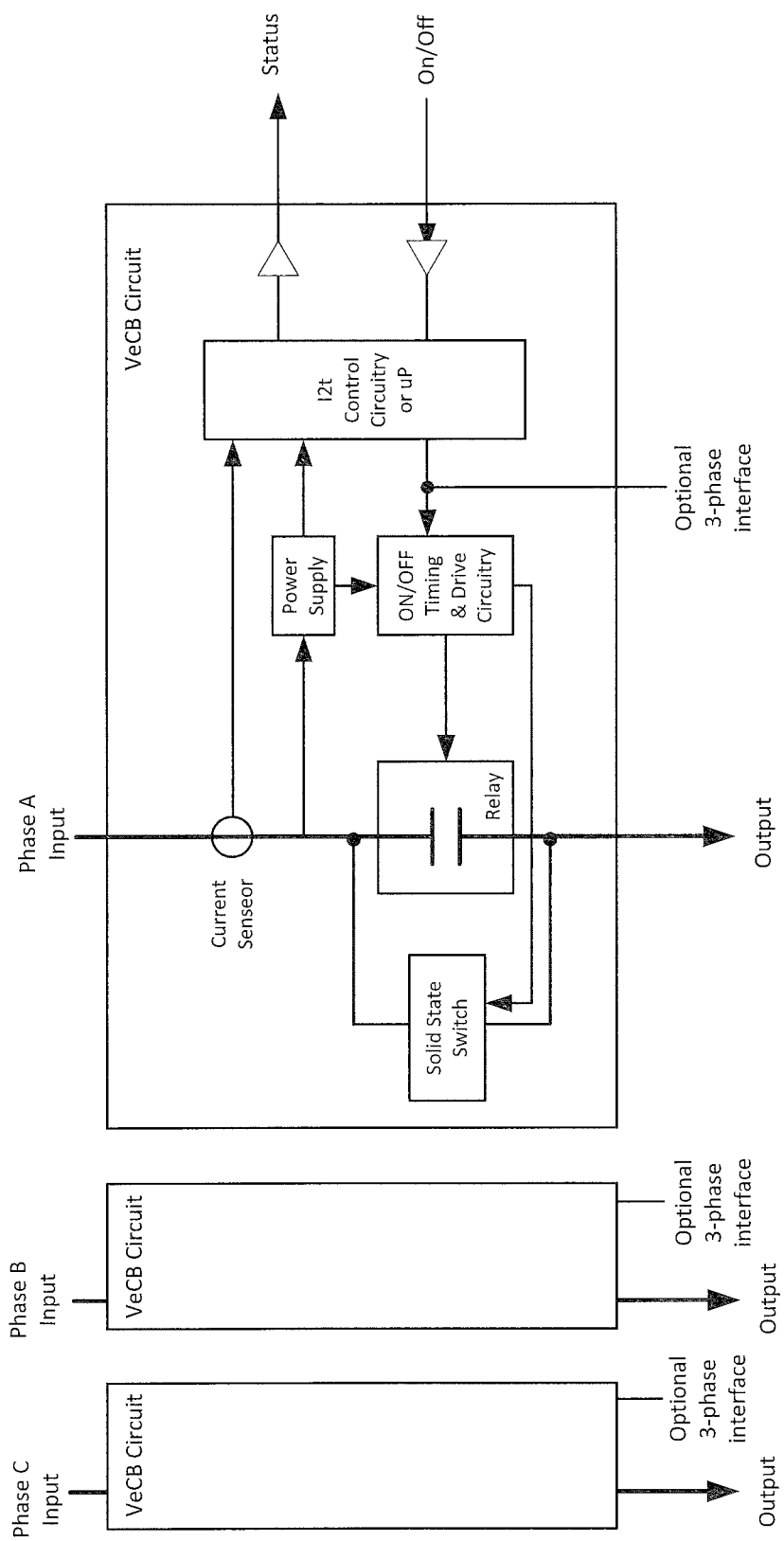
FIG. 8 is a schematic diagram of another embodiment, with the solid state switch in parallel with the relay.

FIG. 8 illustrates an exemplary embodiment, with the circuit breaker including a solid-state switch in parallel with the relay. The inventive device in this embodiment offers the same functionality as a MOSFET-based electronic circuit breaker. In accordance with the invention, the device can be configured for 1-phase, 2-phase or 3-phase operations. Moreover, the device utilizes inexpensive, commercial relays, significantly lowering the cost per channel as compared to full solid-state electronic circuit breakers.

As illustrated, a solid state switch is in parallel with the relay, which prevents arc formation during opening and closing of the relay. The prevention of arc formation increases longevity of the relay, with an expected lifespan of 100 million cycles at its intended current level.

The device allows for the channel rating to be scaled up by utilizing multiple relays in parallel, as well as a higher current solid state switch, while still remaining cost competitive. Thus, a 35 Amp virtual electronic circuit breaker remains cost-effective, with the equivalent function of a thermal circuit and a relay in series, whereas a 35 Amp solid state electronic circuit breaker is cost-prohibitive. Further, the channel I2t rating can be changed utilizing either simple discrete components, or a microprocessor set point.

Shown in Appendix B is a Test Log of the contactor lifecycle test.

It should be understood that various components of the disclosed subject matter may communicate with one another in various manners. For instance, components may communicate with one another via a wire or, alternatively, wirelessly and by electrical signals or via digital information. It is noted that PWB may be utilized in the construction of many embodiments.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A circuit breaker, comprising:
an electrical relay effective to control an amount of power flow;
a control circuit, the control circuit having an OC detection unit, a microprocessor, a driver;
said driver effective to cause said relay to stop said power flow upon receipt by the driver of a deactivation command;
said OC detection unit configured to monitor said power flow; said OC detection unit being connected to the driver and being effective to cause said driver to receive a deactivation command if said OC detection unit senses that an overload condition exists; and
said microprocessor configured to be capable of receiving input from said OC detection unit and sending output to said driver; and,
a redundant source of power connected to the electrical relay and to the control circuit effective to allow the control circuit and the relay to operate while only receiving power from said redundant source of power;
wherein said circuit breaker is located on an aircraft and said microprocessor is adapted to receive at least one of "reset," "collar," "on," or "off" commands from a control panel in said aircraft; the circuit breaker is characterized in that the OC detection unit is directly connected to the driver.

2. The circuit breaker of claim 1 wherein said power flow is selected from the group consisting of 1-phase alternating current (AC), 3-phase AC and direct current (DC).

3. The circuit breaker of claim 2 wherein said power flow is 1-phase AC.

4. The circuit breaker of claim 1 wherein said microprocessor is effective to send to outside said control circuit an amount of indication and status information.

5. The circuit breaker of claim 1 wherein said microprocessor is effective to cause said driver to receive a deactivation command upon receipt by the microprocessor of an "off" command.

6. The circuit breaker of claim 1 wherein said microprocessor is effective to communicate with a programming and test bus.

7. The circuit breaker of claim 1 further comprising a ground fault interruption (GFI) detection unit, wherein said GFI detection unit is integrated with said control circuit.

8. The circuit breaker of claim 7 wherein said GFI detection unit is effective to, when the GFI detection unit senses that a ground fault condition has occurred, communicate to said microprocessor that a ground fault condition has occurred.

9. An electrical system for an aircraft, comprising:
a source of limited power;
a load, drawing an amount of power flow from said source of limited power; and
a circuit breaker in accordance with claim 1.

10. The electrical system of claim 9, wherein said source of limited power is an aircraft engine.

11. The electrical system of claim 10, wherein said load is the actuator mechanism of an aircraft control surface.

12. A method of protecting an electronic circuit, comprising the steps of:
providing a power flow;
providing a circuit breaker in accordance with claim 1;
said microprocessor receiving input from said OC detection unit and sending output to said driver,
monitoring said power flow utilizing said OC detection unit; and
causing said driver to receive from said OC detection unit a deactivation command when an overload condition is sensed.

\* \* \* \* \*